United States Patent [19]

Ishii

[11] Patent Number: 5,065,253
[45] Date of Patent: Nov. 12, 1991

[54] DISK PLAYER WITH DISK TILT OR PICKUP POSITION RESPONSIVE NOISE REDUCTION

[75] Inventor: Hidehiro Ishii, Saitama, Japan

[73] Assignee: Pioneer Electronic Corporation, Tokyo, Japan

[21] Appl. No.: 289,150

[22] Filed: Dec. 23, 1988

[30] Foreign Application Priority Data

Dec. 25, 1987 [JP] Japan .................................. 62-331581
Feb. 15, 1988 [JP] Japan .................................. 63-32111

[51] Int. Cl.$^5$ ............................................. H04N 5/91
[52] U.S. Cl. ..................................... 358/340; 358/342; 369/54; 369/58; 369/107; 369/124
[58] Field of Search ............... 358/327, 328, 336, 340, 358/342; 369/58, 44, 320, 54, 107, 124

[56] References Cited

U.S. PATENT DOCUMENTS

| | | |
|---|---|---|
| 4,064,530 | 12/1977 | Kaiser et al. |
| 4,667,225 | 5/1987 | Kanda |
| 4,682,251 | 7/1987 | Hirota et al. ................... 358/340 X |
| 4,700,336 | 10/1987 | Yoshida et al. |
| 4,780,865 | 10/1988 | Yamakawa ........................ 369/58 X |
| 4,825,289 | 4/1989 | Ohta ................................ 358/340 X |
| 4,825,300 | 4/1989 | Omori ............................. 358/340 X |

FOREIGN PATENT DOCUMENTS 3503461 8/1985 Fed. Rep. of Germany .
3533647 3/1986 Fed. Rep. of Germany .
59-87555 6/1984 Japan .

Primary Examiner—Roy N. Envall, Jr.
Assistant Examiner—W. R. Young
Attorney, Agent, or Firm—Sughrue, Mion, Zinn Macpeak & Seas

[57] ABSTRACT

In a disk player, a tilt detection signal is generated corresponding to a tilt of a recording surface of a disk relative to a reference plane depending on a position of a pickup or a pickup radial position is generated. A reproduced video signal is passed through a noise reduction circuit having a transfer function which is changed in accordance with the tilt detection signal or the radial position signal so as to reduce a noise component. Accordingly, the influence of cross-talk on a picture caused by the tilt of the disk can be electrically reduced, and a complicated mechanism becomes unnecessary, so that it is possible to simplify the structure of the player. Moreover, it is not necessary to select a pickup in which the quantity of cross-talk is small against a tilt of a disk, so that it is possible to make the production cost low.

10 Claims, 2 Drawing Sheets

DISK PLAYER WITH DISK TILT OR PICKUP POSITION RESPONSIVE NOISE REDUCTION

BACKGROUND OF THE INVENTION

The present invention relates to a disk player, particularly relates to a disk player for playing a disk carrying a video signal recording thereon.

For example, in an optical disk player, if the relative angle between an optical axis of an information reading light beam and a recording surface of a disk deviates from a right angle, information will leak from an adjacent track, thereby producing so-called cross-talk phenomenon. Deviation from a right angle may be caused by various factors, such as, for example, a phenomenon that a disk becomes umbrella-like due to secular distortion, a phenomenon that the disk rotation axis is tilted due to the change in shape of a deck portion of a player, and so on. These causes of the problem occur after the shipment of the products, so that it has been impossible to prevent the cross-talk phenomenon from occurring.

Where an information recording disk (hereinafter simply abbreviated as "disk") has a warp due to secular distortion or the like, the information recording surface of the disk is tilted relative to the optical axis of an information detecting light beam emitted from an optical pickup so as to narrow the track pitch between adjacent recording tracks. Assuming that the diameter of a beam spot on the information recording surface is constant, therefore, a track is apt to be affected by pit information of an adjacent track, resulting in increased cross talk. The influence of this cross-talk appears as a noise component in a video signal reproduced from the disk, resulting in deterioration of the picture. In order to improve such deterioration in performance, there has been provided a so-called tilt-servo which is arranged so that the tilt of the optical axis of the information detecting light beam relative to the information recording surface of the disk is detected and the tilt of the pickup is adjusted to keep the optical axis of the light beam always perpendicular to the information recording surface.

As shown in FIG. 1, there is provided a servo system to electrically detect cross-talk in question to always accurately keep the orthogonal relation between a light beam axis and a disk, thereby reducing the cross-talk phenomenon. In FIG. 3, a disk 1 is driven to rotate by a spindle motor 2 and the information recorded on the disk 1 is read out by a pickup 3. The pickup 3 includes a laser diode, an objective lens, a focus actuator, a tracking actuator, a photo detector, a tilt sensor and so on. The output of the photo detector of the pickup 3 is fed to a video signal reproducing/processing circuit 4 as well as an audio signal reproducing/processing circuit 5, and at the same time is fed also to a focus servo circuit (not-shown) as well as a tracking servo circuit (not-shown). These focus and tracking servo circuits drive the focus and tracking actuators in the pickup 3 to thereby control laser light emitted from the laser diode in the pickup 3 so that laser light is focused onto the recording surface of the disk 1 thereby forming an information detecting light spot positioned on a track formed on the recording surface of the spot 1.

The tilt sensor in the pickup 3 is constituted, for example, by a light emission means arranged to emit light directed toward the recording surface, and a pair of light receiving elements arranged to receive light reflected from the recording surface and disposed on a predetermined line perpendicular to the recording track in a plane perpendicular to the optical axis of the emitted light so as to be symmetrical with each other with respect to the light emission means. The output of the tilt sensor in the pickup 3 is fed to a tilt detecting circuit 6. The tilt detecting circuit 6 is, for example, constituted by a differential amplifier arranged to receive at its positive and negative inputs the respective outputs of a pair of light receiving elements constituting the tile sensor. This tilt detecting circuit 6 generates a tilt detection signal corresponding to the tilt of the recording surface of the disk 1 relative to a reference plane depending on a relative angle between the optical axis of the light beam emitted from the pickup 3 and the recording surface of the disk 1. The position of the pickup 3, and the tilt detection signal is fed to a motor in a tilt adjusting mechanism 7 as a driving signal for the motor. The tilt adjusting mechanism 7 is arranged to rotate the pickup 3 in accordance with the tilt detection signal about an axis extending substantially in the direction parallel to the recording surface of the disk 1 and perpendicular to the radial direction of the disk 1 to thereby correct the tilt of recording surface of the disk 1. The tilt sensor, the tilt detecting circuit 6 and the tilt adjusting mechanism 7 are disclosed in Japanese Utility Model Application No. 58-87555.

In the video signal reproducing/processing circuit 4, and FM signal having an instantaneous frequency which changes in accordance with a video signal is extracted from the output of the pickup 3 and fed to an FM modulator so that the video signal is reproduced. The reproduced video signal put out from the video signal reproducing/processing circuit 4 is fed to a video output terminal 9 after noise due to cross-talk and so on caused by the tilt of the disk 1 has been reduced by a noise reduction circuit 8.

In the audio signal reproducing/processing circuit 5, an EFM (Eight to Fourteen Modulation) signal is extracted from the output of the pickup 3 and fed to an EFM demodulator so that an audio signal is reproduced. The reproduced audio signal put out from the audio signal reproducing/processing circuit 5 is fed to an audio output terminal 11 after undesired components have been eliminated by a LPF (Low Pass Filter) 10.

FIGS. 2 and 3 show details of the tilt sensing and correction apparatus of FIG. 1. In FIG. 2, the optical pickup 3 includes an objective lens 40 for reading recorded information of a disk 1 which is driven to rotate by a spindle motor 2. The objective lens 40 is attached to an optics body 50 movable in the direction of its optical axis, and driven by a focus actuator not-shown. The optics body 50 is attached to a slider base 60 so as to be rotatable about a pivotal point 0 positioned on an optical axis A—A' of the objective lens 40. An adjusting mechanism 7 constituted by a tilt motor M (shown in FIG. 3), and reduction mechanism and so on rotates the optics body 50 round the slider base 60 so as to adjust the tilt of the optical axis A—A' of the objective lens 40 relative to the information recording surface. The slider base 60 is arranged to be movable along a not-shown guide rail in the radial direction B—B' of the disk 1, and driven by a driving mechanism (not shown), such as a slider motor, a reduction gear and so on.

In a plane that includes the optical axis A—A' of the objective lens 40 and that is perpendicular to the moving direction of the slider base 60, a tilt sensor 80 is provided in the vicinity of the objective lens 40 in order to detect the tilt angle of the disk 1 relative to the optical axis A—A'. This tilt sensor 80 is, as shown in FIG. 3, constituted by a light emission element 90 and two light receiving elements 100a and 100b, so that a light beam emitted from the light emission element 90 is reflected on the information recording surface of the disk 1 and the light thus reflected is received by the light receiving elements 100a and 100b. A difference between the respective intensities of light received by the light receiving elements 100a and 100b is obtained by a differential amplifier 110, and a signal representing this difference is fed through a driving amplifier 12 to a tilt motor 13 in an adjusting mechanism 7 (shown in FIG. 2), as the information related to the tilt of the disk 1 relative to the optical axis A—A'.

In such an arrangement, when the slider base 60 moves from a position <a> to a position <b> in FIG. 2 and arrives at a tilted portion of an outer circumferential portion of the disk 1, the adjusting mechanism 7 is driven in response to a driving signal based on the output of the tilt sensor 80 so that the optics body 50 is rotated in the clockwise direction in FIG. 2 about the pivotal point 0 so as to carry out a tilt servo to make the optical axis A—A' perpendicular to the information recording surface of the disk 20.

In such a conventional disk player as described above with reference to FIGS. 1-3, the tilt of the recording surface of the disk 1 relative to the reference plane depending on the position of the pickup 3 is corrected by means of a mechanical system, and moreover the reduction of noise is performed by means of the noise reduction circuit 8. In this arrangement, however, there has been a problem that the structure of the arrangement is complicated and expensive. Moreover, since the tilt sensor 80 is mounted on the pickup 3, it becomes difficult to miniaturize the pickup 3. Accordingly, there has been a problem that the circuit arrangement is complicated and the production cost is high.

SUMMARY OF THE INVENTION

It is therefore an object of the present invention to provide a video signal processing circuit in a disk player in which the influence of cross-talk is electrically eliminated in order to solve the foregoing problems of a complicated and expensive structure. Another object of the present invention is to provide a disk player which is simple in arrangement and in which the influence of cross-talk onto a reproduced picture can be reduced.

The foregoing object of the present invention can be attained by a disk player which is arranged so that tilt detection signal is generated corresponding to a tilt of a recording surface of a disk relative to a reference plane depending on the position of the pickup, and the reproduced video signal is passed through a noise reduction circuit having a transfer function which changes in accordance with the tilt detection signal to thereby reduce the noise component of the reproduced video signal.

Alternatively, the video signal processing circuit according to the present invention is arranged so that at least one of the quantity, frequency band and frequency characteristic of attenuation of a noise reduction circuit for eliminating a noise component contained in a reproduced video signal is changed in accordance with a position of an information detection point relative to the diameter of a disk, thereby eliminating a noise component due to cross-talk.

DETAILED DESCRIPTION OF PREFERRED EMBODIMENTS

Figure 1:
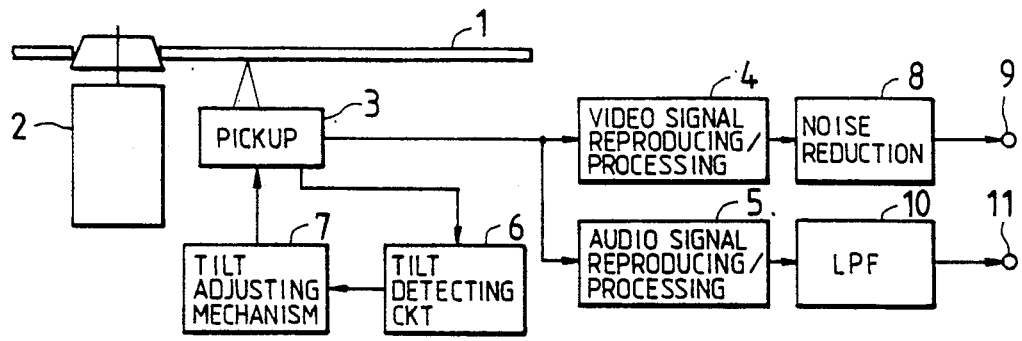
FIGS. 1-3 illustrate in varying detail a known video disk reproduction circuit in which cross-talk due to optical tilt or disk warp is corrected by a servo arrangement for adjusting the optical angle of the pickup.
Figure 3:
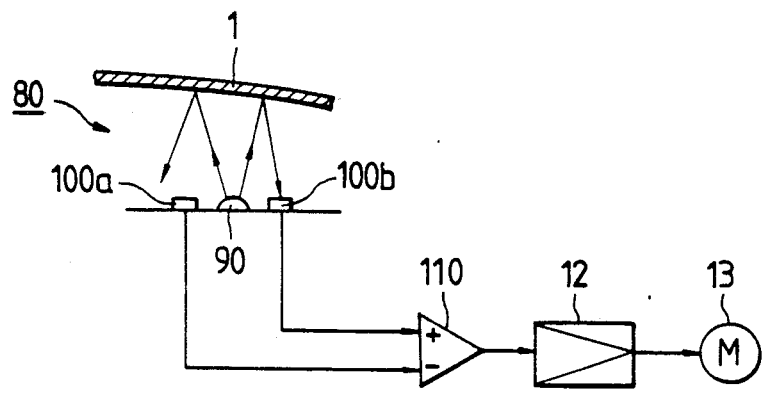
Figure 4:
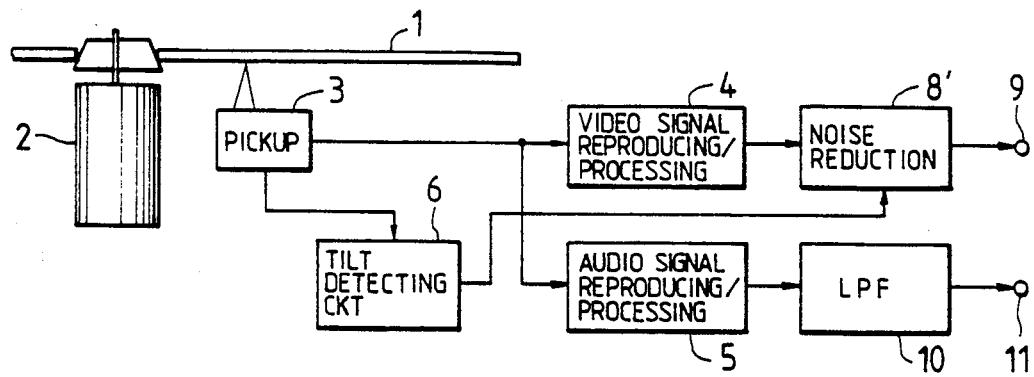
FIG. 4 is a partial block diagram of a video disk reproduction circuit according to an embodiment of the present invention whereby cross-talk is corrected electrically in accordance with detection of the deviation of the optical axis from a right angle intersection of the disk.

In FIG. 4, a disk 1, a spindle motor 2, a pickup 3, a video signal reproducing/processing circuit 4, an audio signal reproducing/processing circuit 5, a tilt detecting circuit 6, a noise reduction circuit 8, and an LPF 10 are connected in the same manner as those in the configuration of FIG. 3. In this embodiment, however, the output of the tilt detecting circuit 6 is fed only to the noise reduction circuit 8' and the tilt adjusting mechanism 7 of FIG. 1 is omitted in this embodiment. The noise reduction circuit 8' is constituted, for example, by a cyclic-type filter. That is, the noise reduction circuit 8' includes, for example, a frame memory which can store a frame of video signals so that an input video signal and a delayed signal obtained by delaying the input video signal by one frame through the frame memory are mixed with each other with a mixing ratio which is continuously changed in accordance with a tilt detection signal to thereby reduce noise.

In the noise reduction circuit 8' having such a configuration as described above, the mixing ratio changed in accordance with the tilt detection signal that the gain of the transfer function of the noise reduction circuit 8' is changed uniformly over a signal frequency band to thereby change the quantity of reduction of noise. Consequently, even if the tilt of the disk 1 relative to a reference plane depending on the position of the pickup 3 becomes large thereby causing a high level of noise due to the cross-talk, it is possible to reduce the influence of cross-talk by making the quantity of reduction of noise in the noise reduction circuit 8' large. The residual image effect becomes large in proportion to the degree of noise reduction in a cyclic-type filter, and the degree of noise reduction in the noise reduction circuit 8' becomes small thereby making the residual effect small when the tilt of the disk 1 relative to a reference plane depending on the position of the pickup 3 becomes small. Thus, the level of noise due to cross-talk is made small, so that it is possible to prevent the picture from being made ugly by a residual image phenomenon.

Figure 5:
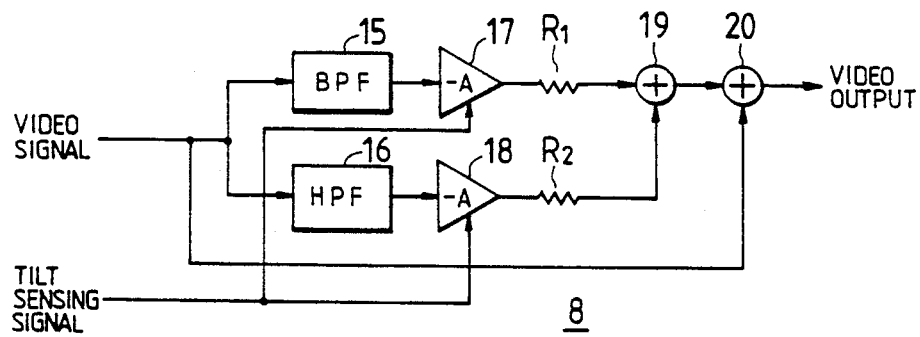
FIG. 5 is a partial block/partial schematic diagram of a modification of FIG. 4, according to another embodiment of the invention.

FIG. 5 is a circuit block diagram illustrating another embodiment of a noise reduction circuit which may be used as circuit 8'. It will be understood that the other blocks 1 to 6 and 9 to 11 are connected in the same manner as those in FIG. 1 and are therefore omitted from FIG. 5. In FIG. 5, a reproduced video signal from the video signal reproducing/processing circuit 4 is fed to a BPF (Band Pass Filter) 15 with a center frequency $f_A$ and a HPF (High Pass Filter) 16 with a cut off frequency $f_B$ ($f_B > f_A$). The center frequency of the BPF 15 and the cut off frequency of the HPF 16 are set so that all the frequency components of noise due to cross-talk pass through either the BPF 15 or the HPF 16. The components having passed through the BPF 15 and the HPF 16 are inverted respectively by the corresponding inverting amplifiers 17 and 18. Each of the inverting amplifiers 17 and 18 is arranged to be responsive to a tilt detection signal from the tilt detecting circuit 6 so that the gain thereof is made large gradually as the tilt of the disk 1 becomes large. The respective outputs of the inverting amplifiers 17 and 18 are fed to an adding circuit 19 through resistors $R_1$ and $R_2$ respectively, the output of which is an antiphase signal of a noise component due to cross-talk. The output of the adding circuit is added to the reproduced video signal by another adding circuit 20, so as to reduce the noise component due to cross-talk.

In the above configuration, in the same manner as the apparatus of FIG. 4, the gain of the transfer function of the noise reduction circuit 8' with respect to a noise component is changed uniformly over a signal frequency band in response to the tilt detection signal, so that it is possible to reduce the influence of noise due to cross-talk. On the other hand, although the respective levels of a component centered about the frequency $f_A$ and a component not lower than the frequency $f_B$ of a reproduced video signal become lower as the respective gains of the inverting amplifiers 17 and 18 become larger, the respective gains of the inverting amplifiers 17 and 18 become smaller when the tilt of the disk 1 becomes smaller to thereby make the level of noise due to cross-talk small, so that it is possible to prevent a picture from being made ugly by a residual image phenomenon.

Although the above embodiment has been described so that the gain of the transfer function of the noise reduction circuit 8' with respect to a noise component is made to change uniformly over a signal frequency band in accordance with the tilt detection signal, the configuration may be modified, for example, the band of the BPF 15 could be made to change in accordance with the tilt detection signal in the noise reduction circuit 8', or the cut off frequency of the HPF 16 could be made to change so as to change the characteristics of the gain of the transfer function. In those cases, it is possible to reduce the influence of cross talk by making the band of BPF 15 wider or making the cut off frequency of the HPF 16 lower as the tilt of the disk 1 becomes larger. Further, both the gain of the transfer function and the frequency characteristic of the noise reduction circuit 8 may be made to change.

It can be also considered that variable resistors are used for the resistors $R_1$ and $R_2$ in the noise reduction circuit 8' of FIG. 5, the resistance values of these variable resistors being made to change in accordance with the tilt detection signal so that the mixing ratio between the output of the adding circuit 19 and a reproduced video signal becomes large as the tilt of the disk 1 becomes larger, so that the gain of the transfer function of the noise reduction circuit 8' with respect to a noise component is changed uniformly over a signal frequency band.

Moreover, although the gain of the transfer function has been made to change continuously in accordance with the tilt detection signal in the abovementioned embodiment, the gain of the transfer function of the frequency characteristic may be made to change stepwise or step by step in accordance with the tilt detection signal.

Figure 6:
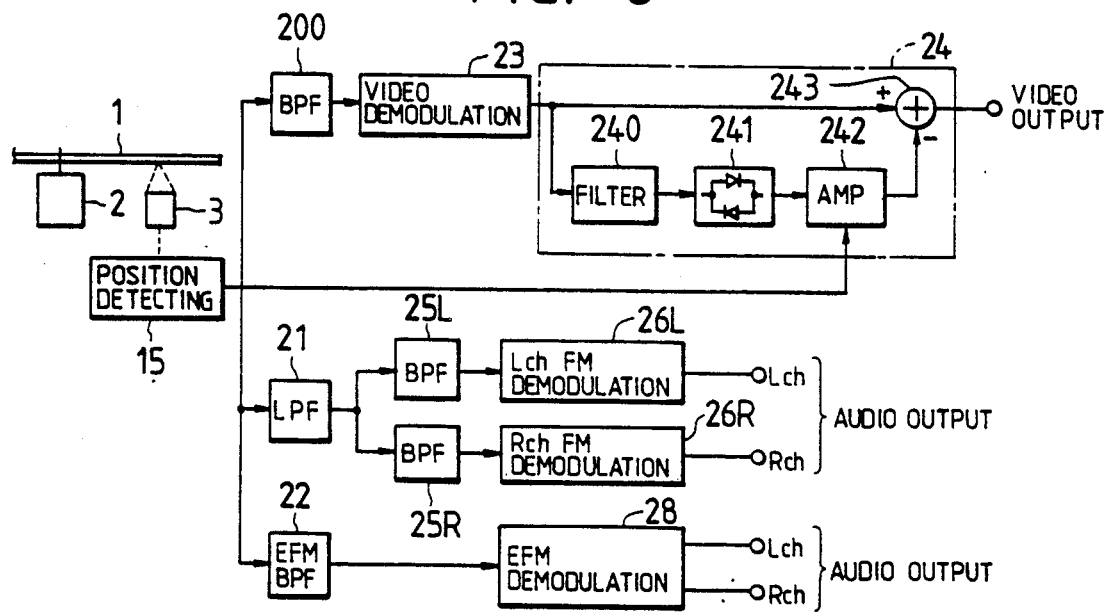
FIG. 6 is a partial block diagram of a video disk reproduction circuit according to an embodiment of the present invention wherein cross-talk is corrected electrically in accordance with detection of the radial position of the optical pickup device relative to the center of the disk.

FIG. 6 illustrates another embodiment an optical disk player provided with a noise reduction circuit according to the present invention. In this player, it is possible to reproduce a usual video disk on which both the video and audio FM signals have been recorded, a Hi-Fi video disk on which the video and audio FM signals and a digital audio signal have been multiple-recorded, and a composite disk called a CDV which has the same size as a compact disk and which carries a digital audio signal recorded in its inner circumferential side and video FM and digital audio signals multi-recorded in its outer circumferential side.

In FIG. 6, a disk 1 is driven by a spindle motor 2, and recorded information on the disk 1 is read by an optical pickup 3. The pickup 3 includes an optical system having a light source such as a laser diode and an objective lens, a photo detector for receiving a reflected light from the disk 1, a focus actuator for controlling the position of the objective lens relative to an information recording surface of the disk 1 in the optical axis direction, a tracking actuator for controlling the position of an information detecting beam spot (information detection point) emitted from the pickup 3 relative to a recording track in the disk diameter direction, and so on. The moving position of the pickup 3 in the radial direction of the disk is detected by a position detector 15, for example, constituted by a slider potentiometer or the like, as is known.

An RF signal of the reading output of the pickup 3 is fed to a band pass filter (BPF) 200 for a video FM signal, a low pass filter (LPF) 21 for an analogue audio FM signal and a BPF 22 for a digital audio EFM signal. A video FM signal having passed through the BPF 200 for a video FM signal is fed to a video demodulator circuit 23 so as to be demodulated into a reproduced video signal which is in turn sent out as a video output through a noise reduction circuit 24. A signal having passed through the LPF 21 is separated into left and right analog audio FM signals by BPFs 25L and 25R for passing therethrough only audio carrier components of 2.3 MHz and 2.8 MHz. The left and right analog audio signals are demodulated into left and right audio outputs by FM demodulator circuits 26L and 26R respectively. On the other hand, an audio EFM signal separated from a reproduced RF signal by the BPF 22 for a digital audio EFM signal is demodulated by an EFM demodulator circuit 20 and put out as left and right audio outputs respectively.

The noise reduction circuit 24 is constituted by a filter 240 for passing therethrough only a signal component of a reproduced video signal within a predetermined band, a limiter 241, for example, constituted by a diode for allowing only a noise component from this signal component to pass through the filter 240. An 242 is used for adjusting the level of this noise component extracted by the limiter 241, and a subtracter 243 for subtracting the noise component adjusted to a proper level by the amplifier 242 from the original reproduced video signal. In this noise reduction circuit 24, for example, the amplifier 242 has a gain which is variable so that the gain increases as the pickup 3 moves to the disk outer circumference, that is, in accordance with the positional information of the pickup 3 in the radial direction of the disk, so as to make the quantity of attenuation of the noise reduction circuit 24 increase.

Figure 2:
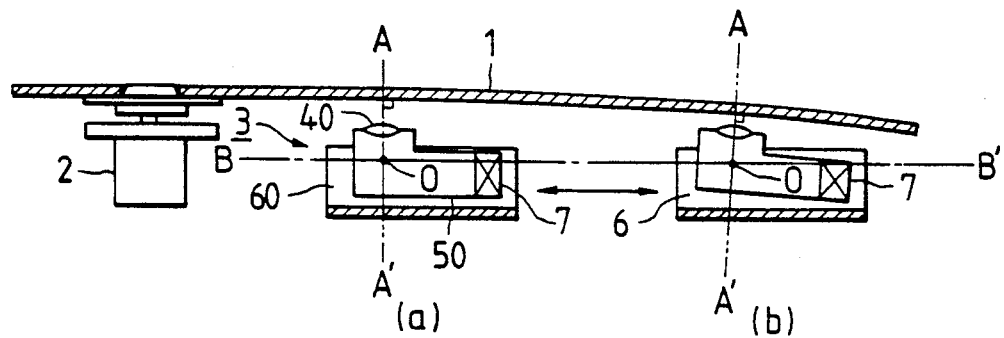

Then, if the disk 1 has a warp, the tilt of the warp becomes larger toward the outer circumference of the disk as is apparent from FIG. 2, so that the level of a noise component which appears in a reproduced video signal due to cross-talk also becomes higher toward the outer circumference of the disk. Therefore, by changing the quantity of attenuation of the noise reduction circuit 24 in accordance with the position of the pickup 3 in the radial direction of the disk, as has been described above, it is possible to electrically reduce the influence of cross-talk onto a reproduced video signal in accordance with the quantity of the cross-talk. Further, since it is possible to continuously detect the position of the pickup 3 in the radial direction relative to the disk by the position detector 15 constituted by a slider pot or the like, the quantity of attenuation of the noise reduction circuit 24 can be changed over the recording area of the disk.

Although the influence of cross-talk is reduced by changing the quantity of attenuation of the noise reduction circuit 24 in the above-mentioned embodiment, the same effect may be obtained by making the band of noise reduction of the filter 240 wider as the pickup 3 moves toward the outer circumference of the disk, or by giving a frequency characteristic to the amplifier 242 so as to change the frequency characteristic of reduction, or by changing the quantity, band and frequency characteristic of attenuation simultaneously. Further, although the quantity, band and frequency characteristic of attenuation are changed continuously in accordance with the position of the pickup 3 in the radial direction of the disk, at least one of the quantity, band and frequency characteristic of attenuation may be changed step by step in accordance with the position of the pickup 3 in the radial direction of the disk.

Although the moving position of the pickup 3 is detected directly by the position detector 15 constituted by a slider pot or the like, time or address data (for example, Q data of subcode, 24 bit code or the like) recorded in the disk 1 may be read and used for positional information.

Although having described a player which can play a CLD disk carrying a video signal and an EFM signal recorded thereon, the present invention is applicable to a player for playing a LD carrying a video signal and an FM-modulated audio signal recorded thereon, a CDV which is a digital audio disk carrying a video signal recorded thereon, a magnetic recording disk, an electrostatic recording disk and so on.

What is claimed is:

1. A disk player for producing an information signal representative of information recorded on a disk, comprising:
   an optical pickup device for reading said recorded information and generating said information signal, said optical pickup device being one which moves radially relative to said disk, selecting locations on said disk to be read, and which has an optical axis which intersects said disk;
   position sensing means for developing a detection signal representing a position of said optical pickup relative to said disk, which detection signal is generally representative of the amount of cross-talk in said information signal; and
   a noise reduction circuit means responsive to said information signal and said detection signal for removing cross-talk noise from said information signal to a degree dependent upon said detection signal.

2. A disk player as claimed in claim 1 wherein said position sensing means comprises means for detecting the radial position of said pickup device relative to said disk and for generating a radial position signal representing said radial position, said radial position signal constituting said detection signal.

3. A disk player as claimed in claim 2 wherein said noise reduction circuit means comprises, a band pass filter connected to receive said information signal and produce a band pass filtered signal, an amplifier connected to receive said band pass filtered signal and produce an amplified band pass filtered signal, and combining means for combining said band pass filtered signal and said information signal; at least one of the pass band of said band pass filter, the gain of said amplifier, and the frequency characteristic of said amplifier being dependent upon said radial position signal.

4. A disk player as claimed in claim 3 wherein said noise reduction circuit means further comprises gain control means responsive to said radial position signal for varying the gain of said amplifier in dependence upon said radial position signal.

5. A disk player for producing an information signal representative of information recorded on a disk, comprising:
   an optical pickup device for reading said recorded information and generating said information signal, said optical pickup device being one which moves radially relative to said disk, selecting locations on said disk to be read, and which has an optical axis which intersects said disk;
   means for detecting the deviation from a right angle of the angle of intersection of said optical axis and said disk and for generating a tilt detection signal representing said deviation; and
   a noise reduction circuit means responsive to said information signal and said detection signal for removing cross-talk noise from said information signal to a degree dependent upon said detection signal.

6. A disk player as claimed in claim 5 wherein said noise reduction circuit means comprises cyclic filter means for mixing an undelayed video frame of said information signal with a one-frame-delayed video signal of said information signal in amounts dependent upon said tilt signal.

7. A disk player as claimed in claim 5 wherein said noise reduction circuit means comprises a band pass filter for band pass filtering said information signal, a high pass filter for filtering said information signal, combining means for combining the band passed and high passed information signals to form a combined filtered information signal, and a mixer for mixing said combined filtered information signal with said information signal, said combining means comprising means responsive to said tilt signal for altering the composition of said combined filtered information signal.

8. A disk player as claimed in claim 7 wherein said combining means comprises variable amplifiers connected respectively to the outputs of said band pass and high pass filters, said variable amplifiers being connected to receive and vary their amplification in dependence upon said tilt signal.

9. A disk player as claimed in claim 8 wherein said combining means further comprises a pair of resistors connected respectively to the outputs of said two amplifiers, and an adder connected to said two resistors.

10. A disk player as claimed in claim 5 wherein said noise reduction circuit means comprises a band pass filter connected to receive said information signal and provide a band pass filtered signal, a high pass filter connected to receive said information signal and provide a high pass filtered signal, means connected to said band pass and high pass filters for combining said band pass and high pass filtered signals into a combined filtered signal, means for combining said combined filtered signal with said information signal, and means responsive to said tilt signal for varying at least one of the pass band and cut off frequency of said band pass and high pass filters, respectively.

* * * * *